Nov. 23, 1965     L. E. HENYON     3,219,164
TRANSMISSION LOCK

Filed Nov. 29, 1963     2 Sheets-Sheet 1

INVENTOR
LEWIS E. HENYON
BY
*Kenneth C. Witt*
ATTORNEY

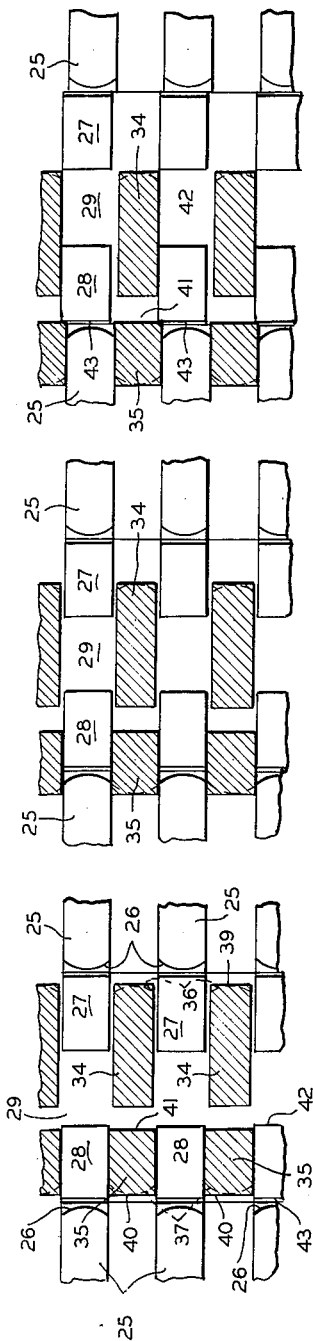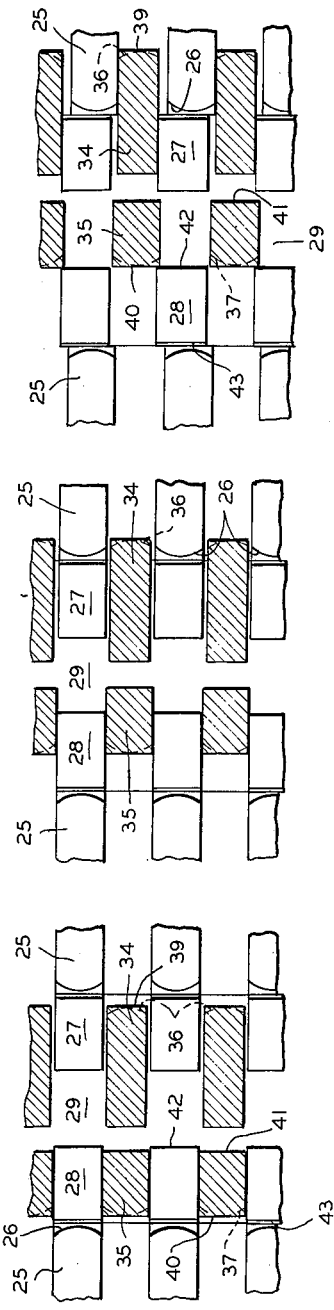

United States Patent Office 3,219,164
Patented Nov. 23, 1965

1

3,219,164
TRANSMISSION LOCK
Lewis E. Henyon, Jackson, Mich., assignor to Clark
Equipment Company, a corporation of Michigan
Filed Nov. 29, 1963, Ser. No. 326,688
6 Claims. (Cl. 192—114)

The present invention relates to a lock for a mechanical shift transmission of the toothed clutch type to prevent return shifting of a shiftable member by means of blocker teeth, and more particularly to such a lock in which the interengaging teeth are chamfered for easy, non-clashing engagement.

The locking against return shifting of a shiftable clutch collar or the like of a toothed clutch mechanism in an automotive or like transmission by means of abutting shouldering, or blocking engagement of the teeth in a desired shifted position has been known for some time in the transmission art. The expired Brownyer Reissue Patent No. 23,018 of July 27, 1948, for example, discloses a transmission locking mechanism of this type. In such an arrangement, the shift collar or like shifting member is held against return shifting from engagement with one of the members or elements clutchable thereby, during application of driving torque through the clutch collar, by circumferential overlapping of at least certain of its teeth with the teeth of the engaged member or element. The overlapped relation is maintained by reason of the application of torque, so that such torque application must be interrupted to permit unlocking and subsequent return shifting of the clutch collar. The present invention constitutes an improvement over the locking arrangement of the prior art, such as that of the Brownyer patent referred to hereinabove, in providing flat end faces and sharp corners on the locking teeth which are necessary for assuring the desired locking of the teeth, while at the same time providing for rounded or chamfered ends on the teeth to facilitate the interengagement or meshing of the teeth in the shifting operation so as to assure the desired smooth shifting and avoid clashing of the teeth and possible damage.

It is accordingly an important object of the invention to provide a lock for toothed clutches of power transmission mechanisms providing for smooth, easy shifting of the clutch mechanism between different positions and at the same time providing for secure locking of the clutch mechanism in each of such positions.

Another object of the invention is the provision of an arrangement for torsional locking by circumferential overlapping of the teeth of a toothed clutch mechanism which provides flat end faces and sharp corners on the overlapping teeth to assure locking, while also providing for chamfering of the ends of the teeth to allow smooth engagement of the teeth in shifting from one position to another.

Other and further objects, advantages and features of the invention will be apparent to those skilled in the art from the following detailed description, taken in conjunction with the accompanying drawings, in which:

FIGURE 4 is an enlarged view taken subtantially as indicated by the section line 4—4 of FIG. 1, showing in section the internal teeth of the shifting member of the clutch mechanism, and in plan the external teeth of the other members, with the parts in neutral position;

FIGURE 5 is a view similar to FIG. 4, but with the internal teeth shifted to the left, as viewed in the figure, into engaged relation with the teeth of an adjacent member;

FIGURE 6 is a view similar to FIGS. 4 and 5, but showing the teeth of the shifting member in torque-transmitting and locked engagement with the teeth of the adjacent member;

FIGURE 7 is a view substantially identical to FIG. 4, showing the parts in neutral position;

FIGURE 8 is a view similar to FIG. 7, but showing the internal teeth of the shifting member moved to the right, as viewed in the figure, into engagement with the teeth of the adjacent member; and FIGURE 9 is a view similar to FIGS. 7 and 8, but showing the shifting member teeth in torque-transmitting engagement with the adjacent member.

Figure 1:
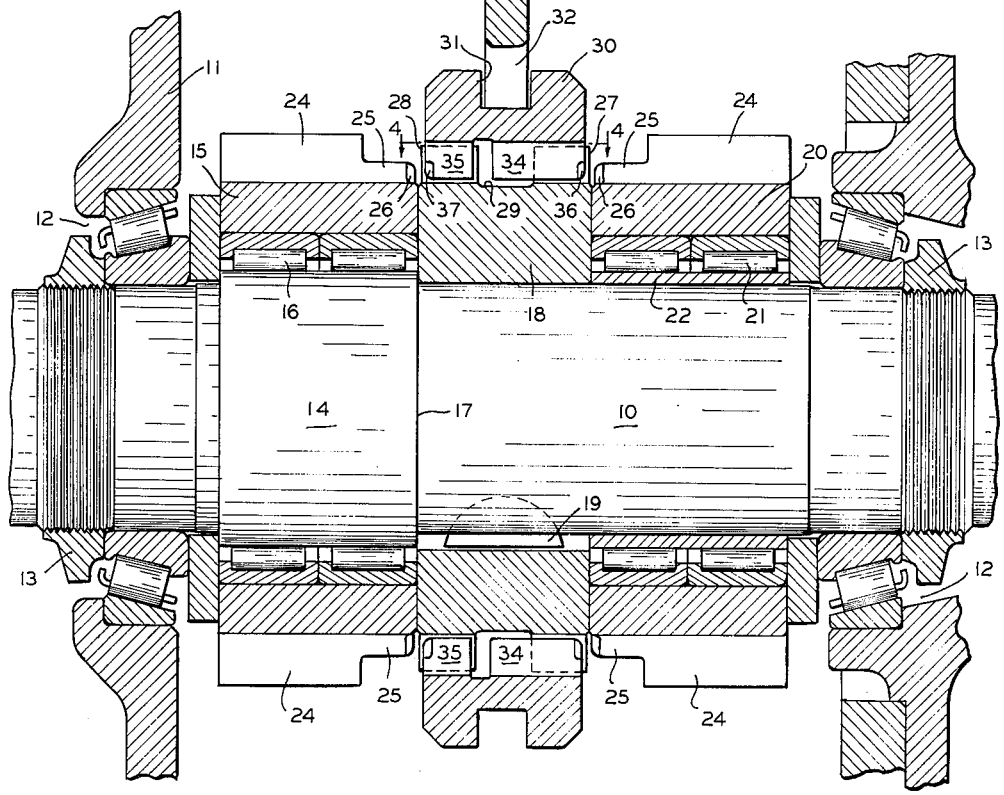
FIGURE 1 is a longitudinal sectional view through a toothed clutch mechanism of a transmission, provided according to the present invention, with the parts in neutral other members, with the parts in neutral position.

Referring first to FIG. 1 of the drawings, there is shown a shaft 10 journaled in a transmission housing 11 by means of roller bearings 12, the shaft being held against axial movement by means of suitable nut members 13 threaded on the opposite end portions of the shaft and engaging against the roller bearing races. The shaft is provided with an enlarged portion 14, on which a forward gear 15 is rotatably mounted by means of anti-friction roller bearings 16 for which the enlargement provides the inner race. A shoulder 17 is defined on the shaft 10 by the enlarged portion 14, and one face of the gear is disposed substantially flush with this shoulder. Engaged against the shoulder 17 and the gear 15 is a hub member 18 secured against rotation on the shaft in any suitable manner, as by a key 19. A rearward or reverse gear 20 is rotatably mounted on the shaft 10 by means roller bearings 21, on the opposite side of the hub 18 from gear 15, disposed about a sleeve 22 surrounding the shaft and having an external diameter equal to that of the enlarged shaft portion 14. The sleeve 22, like the enlargement 14, serves as the inner race for the bearing rollers. It will be evident that the gears 15 and 20 are rotatable relative to each other and to the shaft 10 and hub member 18 fixed thereon.

The gears 15 and 20 are shown as identical, although disposed in opposite or reverse relation to each other. Each gear has a plurality of gear teeth 24 provided about its circumference, each tooth extending from one face toward the opposite face, but terminating short thereof, thus leaving space on the periphery of the gear hub for axially extending clutch teeth 25. In the present instance, the clutch teeth 25 are formed as positions or continuations of the gear teeth 24, although this is not necessary to the invention. The clutch teeth in this instance are also shown as of lesser height than the gear teeth 24, although this also is not required for the invention. The gears 15 and 20 are arranged on the shaft so that the clutch teeth 25 of each are disposed adjacent the hub member 18. The axially outer ends of the clutch teeth 25, or in other words the ends thereof adjacent the hub member, are rounded or chamfered as indicated at 26. The hub 18 is provided on its periphery with two rows of axially aligned teeth 27 and 28, separated by a generally central space 29, the teeth 27 and 28 being substantially identical and of a height appreciably greater than that of the clutch teeth 25 of the gears 15 and 20. The clutch teeth 27 and 28 of the hub 18 are spaced circumferentially about the hub in correspondence to the spacing of the clutch teeth 25 of the gears, so that the clutch teeth 25, 27 and 28 of the gears and hub may be brought into substantial registry or alignment. As will be evident from the drawing, what may be termed the root diameter of the hub 18 is the same as the root diameter of the gears 15 and 20.

Surrounding the hub member 18 in axially slidable relation thereon is a clutch collar 30, formed with a circumferential external groove 31 in which engages a shifting fork 32 movable to shift the collar in either axial direction on the hub, so as to engage partially over the hub and partially over either of the gears 15 or 20. The shank 33 of the fork 32 extends to any suitable means for mounting and shifting the fork, and not illustrated since they do not form part of the present invention. The thickness, or axial dimension, of the shift collar 30 is no greater than that of the hub 18.

The annular clutch collar 30 has two axially spaced rows of clutch teeth 34 and 35 circumferentially spaced in correspondence to the clutch hub teeth 27 and 28, so as to be interengageable with the clutch teeth 25 of the two gears. The teeth 35 have a length or axial dimension less than the width or axial dimension of the space 29 between the teeth 27 and 28, and a width or thickness substantially equal to the circumferential spacing of the clutch teeth of the hub 18 and of the gears, so as to be closely engageable therewith without appreciable play or backlash. The collar clutch teeth 34 are substantially narrower or thinner than the teeth 35, and also are considerably longer, or of greater axial dimension, as will be apparent from the drawings. Each pair of teeth 34 and 35 are in axial alignment with each other, that is, they are centered on a common axial plane of the collar 30. The height of the teeth 34 and 35 is substantially the same as that of the clutch teeth 27 and 28 of the hub 18, and appreciably greater than the height of the clutch teeth 25 of the gears 15 and 20. The axially outer ends of the teeth 34 and 35, which initially engage with the teeth 25 in shifting of the collar in one direction or the other, are rounded or chamfered as shown at 36 on the teeth 34 and at 37 on teeth 35. In shifting or sliding movement of the collar 30, it will be evident that the chamfers 26 and 37, or 26 and 36, as best shown in FIGS. 5 and 8, provide for smooth interengagement or meshing of the collar clutch teeth with the clutch teeth 25 of the gears. The chamfers facilitate axial movement of the collar teeth between the teeth 25, serving to guide the collar clutch teeth into the spaces between the clutch teeth 25, in the event of misalignment of the hub clutch teeth 27 and 28 with the gear clutch teeth 25, or of relative rotation between the hub member 18 and the gear 15 or gear 20. The chamfers 36 and 37 extend along the ends of the respective teeth 34 and 35 for only a portion of the height thereof, for a distance corresponding to the height of the chamfered ends of the clutch teeth 25. The remainders of the end surfaces of the collar clutch teeth are substantially flat and substantially normal to the axis of the collars, as indicated at 39 on the teeth 34, and at 40 on the teeth 35. The opposite, or axially inner, end surfaces of the teeth 35, indicated at 41, also are substantially flat and normal to the axis of the collar 30, so that the teeth 35 are of substantially rectangular shape at the portion adjacent their roots, with subtsantially square and sharp corners, as best shown in FIGS. 4 to 9 inclusive. The axially inner end faces of the teeth 34, while also shown as flat, may be of any desired configuration. The axially outer and inner end faces, indicated respectively at 42 and 43, of the teeth 28 of the hub member 18 are substantially flat and normal to the collar axis, as is also evident from FIGS. 4 to 9 inclusive.

Figure 2:
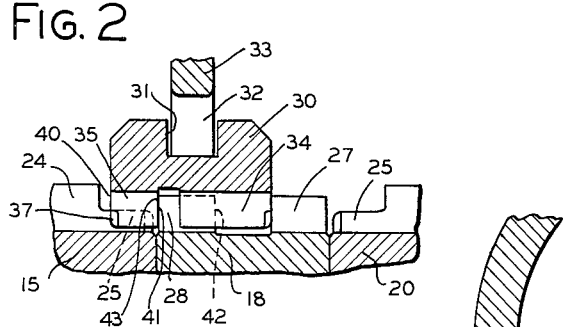
FIGURE 2 is a fragmentary view of a portion of FIG. 1, with the toothed clutch structure locked in one shifted engaged position.

It will be evident that by operating the clutch fork 32 to shift the clutch collar 30 to the left as viewed in the drawings, a drive connection is established between the shaft 10 and the forward gear 15, through the clutch teeth of the gear, collar 30, and hub 18, and that a similar drive connection of the reverse gear 20 to the shaft is provided by shifting the collar to the right as viewed in the drawings. The two shifted positions of the collar 30 are clearly shown in FIGS. 2 and 3, the collar being shown in its neutral postion in FIG. 1. The movement of the collar in both directions may be limited by any suitable means, if desired. As already explained, by reason of the chamfers on the axially outer ends of the several clutch teeth of the collar and of the gears, the collar clutch teeth are smoothly and easily brought into engagement with the clutch teeth 25 of the gears, without danger of damage to the teeth or excessive wear thereon. At the same time, the collar teeth do not require strict and exact registration or alignment of the clutch teeth on the hub and the gear in order to be engageable therewith, nor elimination of relative rotation between the hub and the gear to be clutched. It is contemplated, however, that the invention may be employed in a transmission in which the shaft and clutch hub are prevented from rotating, as by suitable braking means, when the collar 30 is to be shifted. The flat end faces 39 and 40 of the clutch collar teeth 34 and 35 clear the radially outer ends or edges of the clutch teeth 25 of the respective gears 20 and 15, by reason of the relative extent of the chamfers 26, 36, and 37, and thus do not interfere with the interengaging movement of the teeth.

Upon shifting of the clutch collar 30 in one direction or the other drivingly to connect one or the other of the gears 15 and 20 with the hub 18 and shaft 10, the wide teeth 35 of the collar engage lockingly with the teeth 28 of the clutch hub to prevent undesired shifting of the collar in the return direction. When the collar is shifted from its neutral position as shown in FIG. 1 to the left as viewed therein to the position shown in FIG. 2 for interconnection with the forward gear 15, the clutch teeth assume the positions shown successively in FIGS. 4 to 6 inclusive. From the neutral position shown in FIG. 4, the teeth 34 and 35 on the collar move so that the teeth 35 are projected axially outwardly of the hub 18, bridging the space between it and the gear 15, with the chamfers 37 engaging the chamfers 26 of the clutch teeth 25 of the forward gear 15, so that the teeth 35 move smoothly into the spaces between the teeth 25, the flat outer end face portions 40 clearing the teeth 25. As shown in FIG. 5, when the chamfered portions 37 of the teeth 35 pass the chamfers 26 of the clutch teeth 25, the teeth 35 engage closely in the spaces between the clutch teeth 25, and serve to effect initial interengagement of the clutch teeth of the collar 30 and of the gear 15, to place the gear in driven relation with the hub 18 and shaft 10. As movement of the clutch collar 30 to the left continues, the teeth 35 of the collar pass axially outwardly of the teeth 28 of the hub. Due to the fact that the teeth 34 are narrower than the teeth 35, and thus have their long sides offset inwardly relative to the longitudinal sides of the teeth 35, the hub 18 must rotate relative to the gear 15 in order to effect engagement between its clutch teeth and the teeth 34, and thus transmit torque to the gear. Such relative rotation results in a circumferentially overlapped relation and an axially abutting engagement between marginal portions of the axially inner faces 41 of the clutch collar teeth 35 and the axially outer faces 43 of the hub clutch teeth 28, the width of the marginal portions of these surfaces which are engaged depending upon the difference in width or thickness of the teeth 34 and 35. The direction of rotation of the hub 18 of course determines which marginal portions of the surfaces 41 are engaged with the several teeth 28. In the drawings, the shaft 10 and hub member 18 are indicated as rotating in a direction to move the hub teeth 27 and 28 in the direction indicated by the arrow. By reason of the abutting or shouldered engagement of the surfaces 41 and 43, the collar 30 is locked against movement to the right, for return movement from its leftward shifted position, so long as torque is being transmitted from the teeth 28 of the hub to the teeth 34 of the collar, which of course maintains the hub teeth offset forwardly of the gear clutch teeth 25 in the direction of movement of the teeth. Interruption of application of torque to the teeth 34 allows disengagement of teeth 35 from the overlapped locking engagement with teeth 28, so that the collar 30 may be moved to the right to its neutral position.

Figure 3:
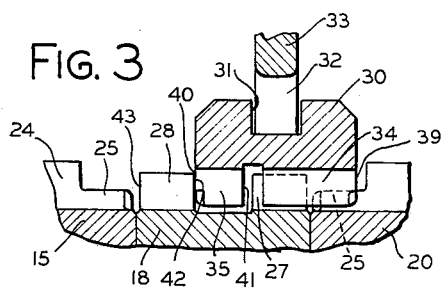
FIGURE 3 is a view similar to FIG. 2, but showing the toothed clutch locked in another engaged position.

When the clutch collar 30 is shifted to the right, as viewed in the drawings, from the neutral position of FIGS. 1 and 7, to move the clutch teeth 34 and 35 to the right to the position shown in FIGS. 3 and 9, so as to establish a driving connection between the shaft 10 and the rearward or reverse gear 20, the chamfered end portions 36 of the longer and narrower teeth 34 engage with the chamfers 26 of the clutch teeth 25 of gear 20 to be guided thereby into the spaces between the teeth 25, as shown in FIG. 8. This movement of the teeth 34 is more readily effected than movement of the teeth 35 between the teeth 25 of the gear 15, by reason of the greater clearance resulting from the relative narrowness of the teeth 34. As the movement of the collar 30 to the right continues, the flat end portions 39 of the teeth 34 adjacent the roots thereof clearing the teeth 25, the collar comes to a position disposing the teeth 34 and 35 thereof in the axial position relative to the hub 18 and gear 20 illustrated in FIG. 9. In this position, the teeth 35 are disposed between the planes of the axially inner ends of the hub clutch teeth 27 and 28, or in other words within a circumferential projection of the space 29, so that the flat face portions 40 of the teeth 35 may be brought into circumferentially overlapping relation with the axial inner flat faces 42 of the hub teeth 28 upon relative rotation of the hub 18 and collar 30. With the teeth 34 and 35 so positioned axially relative to the hub and gear 20, rotation of the shaft 10 results in relative rotation of the hub and collar to bring the hub teeth 27 into engagement with the collar teeth 34. At the same time, the hub teeth 28 and collar teeth 35 are brought into circumferentially overlapped relation, with edge portions of the flat surfaces 40 of the teeth 35 engaging with edge portions of the axially inner flat faces 42 of the teeth 28, as shown in FIG. 9. Continued rotation of the shaft 10 then effects rotation of the hub and collar to bring the teeth 34 into engagement with the teeth 25 of the gear 20, and thus to transmit driving torque through the teeth 34 to the gear 20, as shown in FIG. 9. As in the case of the collar position when shifted to the left, the overlapped, axially abutting or shouldering engagement of the teeth 28 and 35 blocks return shifting of the collar 30 from its right hand position, as evident from FIG. 9, so long as the application of torque continues. When the transmission of torque is interrupted, the collar teeth 35 may be disengaged from their blocking and locking engagement with the hub teeth 28 to allow return of the collar to its neutral position. The direction in which the collar clutch teeth 35 are displaced or offset circumferentially relative to the teeth 28 to effect the transmission lock, of course, depends upon the direction of rotation of the shaft and hub, which in this instance is the same as in FIG. 6, as indicated by the arrow.

It will be apparent that the invention provides for locking of the clutch collar in either of its shifted or non-neutral positions by means of circumferentially overlapping flat transversely-extending surfaces on certain of the collar clutch teeth with cooperable surfaces of clutch teeth on the hub, yet provides chamfers on the collar teeth for engaging corresponding chamfers on the adjacent clutch teeth of the gears to facilitate the shifting and interengagement of the members. The invention thus eliminates any need for special provisions to facilitate the shifting and engagement of cooperating teeth for transmission of torque when blunt or non-chamfered clutch teeth are provided on the collar. A simple solution is thus provided to the problem of providing flat or blunt ends on the collar teeth to effect the desired locking, and at the same time avoid the difficulty of effecting the desired movement and engagement of the teeth in establishing a drive connection.

It may be pointed out that while the gears 15 and 20 are herein disclosed respectively as a gear for effecting forward drive of any desired driven member, as through a suitable gear train, and a gear for effecting rearward or reverse drive of such driven member, they might instead be employed to effect driving at different speeds, or to drive different driven members. It will also be apparent that the gears may be of different pitch diameters, if desired, the clutch teeth 25 of either or both being provided on a laterally offset hub portion of smaller diameter than the root diameter of the gear proper. Of course, the clutch teeth 25 may be provided on other members than gears, if desired, which are to be driven from the shaft 10. It will also be understood that the arrangement may be such that the shaft 10 is driven from one or the other of the gears or other members through the clutch collar and hub, if desired. The clutch teeth 25 on the gear 20, it will be evident, need not be of the reduced height shown, but may be of as great a height as the teeth 34 of the collar which are engageable therewith, and accordingly the chamfer 26 on the axially outer end of the teeth 34 may extend throughout the full height of these teeth, and of course if desired the chamfers may extend for the full height of the teeth 34 even if the clutch teeth 25 of gear 20 be of lesser height than the clutch teeth. In this connection, it may further be pointed out that if the gear teeth 24 of the gear 20 are of suitable height, the portions thereof extending adjacent the hub 18 may be employed as clutch tooth portions engageable and cooperable with the collar clutch teeth 34, the ends thereof being suitably chamfered for cooperation with the chamfers 36 on the axially outer ends of the teeth 34. The use of identical gears for the gears 15 and 20 allows economies in manufacture and assembly, by permitting greater production runs of the gears and reducing the number of different parts employed in the mechanism. As has been pointed out, the gears 15 and 20 are identical, and are merely arranged on the shaft in reverse disposition.

It will be understood that the single embodiment of the invention illustrated herein is exemplary of the inventive concept and that the invention is not limited to such embodiment, since modifications and variations thereof, some of which have been described and suggested hereinabove, may be made without departing from the spirit and scope of the invention as set forth in the appended claims.

I claim:

1. In a selective power transmission lock including a shaft, first and second externally toothed members mounted in axially spaced relation on said shaft for rotation relative thereto, a shift hub in rotatably fixed relation on the shaft between said toothed members and having two axially spaced rows of circumferentially spaced external teeth thereon alignable with the teeth of the toothed members, and a shift collar shiftable axially over said hub and toothed members and having first and second axially spaced rows of aligned circumferentially spaced internal teeth engageable with the teeth of the hub and toothed members and of a height substantially equal to that of the hub teeth, the teeth of said first row being chordally wider than the teeth of said second row and axially shorter than the space between said two rows of teeth of the shift hub, said wider teeth engaging in circumferentially overlapped relation alternatively with the axially outer and inner ends of the teeth of one of the two hub rows upon shifting of the collar to engage the internal collar teeth in driving relation with the external teeth of the hub and of one or the other of the toothed members and upon application of torque, said inner and outer ends of said one row of teeth having flat abutment surfaces, whereby to prevent return shifting of the collar during said torque application, the improvement comprising chamfers on the axially outer ends of the collar teeth and on the opposed axially outer ends of the teeth on said toothed members, the teeth of said members being of less height than the teeth of the hub and collar, at least the chamfers on the axially outer ends of the wider collar teeth and on the opposing ends of the teeth on the axially adjacent toothed member extending for less than the full height of said collar teeth, and flat abutment surfaces on said outer ends of the wider teeth at the root portions thereof engageable with the abutment surfaces on the inner ends of said one row of hub teeth in one shifted position of the collar, said abutment surfaces of the wider teeth clearing the teeth of said axially adjacent toothed member in said position.

2. In a selective power transmission lock including a shaft, first and second clutchable members mounted in axially spaced relation on said shaft for rotation relative thereto and having external teeth thereon, a shift hub in rotatably fixed relation on the shaft between said toothed members and having two axially spaced rows of circumferentially spaced external teeth thereon, said hub teeth being alignable with the teeth of the toothed members, and a shift collar shiftable axially over said hub and toothed members and having first and second axially spaced rows of aligned circumferentially spaced internal teeth engageable with the teeth of the hub and said clutchable members and of a height substantially equal to that of the hub teeth, the teeth of said first row being chordally wider than the teeth of said second row and axially shorter than the space between said two rows of teeth of the shift hub, said wider teeth being disposable in circumferentially overlapping relation alternatively with the axially outer and inner ends of the teeth of one of the two hub rows upon shifting of the collar to engage the internal collar teeth in driving relation with the external teeth of one or the other of said members and of the hub and upon application of torque, said inner and outer ends of said one row of teeth having flat abutment surfaces, whereby to prevent return shifting of the collar during said torque application, the improvement comprising a chamfer on the axially outer end of each of the collar teeth and on the opposed axially outer ends of the teeth on said members, at least the chamfers on the axially outer ends of the wider collar teeth and on the opposing ends of the teeth on the axially adjacent clutchable member extending for less than the full height of said collar teeth, and flat abutment surfaces on said outer ends of the wider teeth, the teeth on said axially adjacent clutchable member having a height sufficiently less than that of the wider teeth to be cleared by said abutment surfaces of the wider teeth.

3. In a selective power transmission lock including a shaft, first and second clutchable members mounted in axially spaced relation on said shaft for rotation relative thereto and having external teeth thereon, a shift hub in rotatably fixed relation on the shaft between said toothed members and having two axially spaced rows of circumferentially spaced external teeth thereon, said hub teeth being alignable with the teeth of the toothed members, and a shift collar shiftable axially over said hub and toothed members and having first and second axially spaced rows of aligned circumferentially spaced internal teeth engageable with the teeth of the hub and said clutchable members and of a height substantially equal to that of the hub teeth, the teeth of said first row being chordally wider than the teeth of said second row and axially shorter than the space between said two rows of teeth of the shift hub, said wider teeth being disposable in circumferentially overlapping relation alternatively with the axially inner and outer ends of the teeth of one of the two hub rows upon shifting of the collar to engage the internal collar teeth in driving relation with the external teeth of the hub and of one or the other of said members and upon application of torque, said inner and outer ends of said one row of teeth having flat abutment surfaces whereby to prevent return shifting of the collar during said torque application, the improvement comprising chamfers on the axially outer ends of the wider collar teeth and on the opposed axially outer ends of the teeth on the axially adjacent clutchable member, said chamfers extending for less than the full height of said collar teeth, and the teeth on said axially adjacent member being of substantially the same height as the chamfers on the wider teeth.

4. In a selective power transmission lock including a shaft, first and second clutchable members mounted in axially spaced relation on said shaft for rotation relative thereto and having external teeth thereon, a shift hub in rotatably fixed relation on the shaft between said toothed members and having two axially spaced rows of circumferentially spaced external teeth thereon, said hub teeth being alignable with the teeth of the toothed members, and a shift collar shiftable axially over said hub and toothed members and having first and second axially spaced rows of aligned circumferentially spaced internal teeth engageable with the teeth of the hub and said clutchable members and of a height substantially equal to that of the hub teeth, the teeth of said first row being chordally wider than the teeth of said second row and axially shorter than the space between said two rows of teeth of the shift hub, said wider teeth engaging in circumferentially overlapping relation alternatively with the axially outer and inner ends of the teeth of one of the two hub rows upon shifting of the collar to engage the internal collar teeth in driving relation with the external teeth of the hub and of one or the other of said members and upon application of torque, said inner and outer teeth ends having flat abutment surfaces, whereby to prevent return shifting of the collar during said torque application, the improvement comprising chamfers on the axially outer ends of the collar teeth and on the opposed axially outer ends of the teeth on said members, said chamfers extending for less than the full height of said collar teeth, and flat abutment surfaces on said outer ends of the wider teeth at the root portions thereof.

5. A lockable shift transmission comprising a shaft, first and second clutchable members mounted in axially spaced relation on said shaft for rotation relative thereto and having external circumferentially spaced teeth thereon, a shift hub in rotatably fixed relation on the shaft between said toothed members and having two axially spaced rows of circumferentially spaced external teeth thereon, said hub teeth being alignable with the teeth of said clutchable members, a shift collar shiftable axially over said hub and members and having first and second axially spaced rows of aligned circumferentially spaced internal teeth engageable with the teeth of the hub and said clutchable members and of a height substantially equal to that of the hub teeth, the teeth of said first row being chordally wider than the teeth of said second row and axially shorter than the space between said two rows of teeth of the shift hub and of greater height than the teeth on said members, said wider teeth engaging in circumferentially overlapping relation alternatively with the axially outer and inner ends of the teeth of one of the two hub rows upon shifting of the collar to project axially beyond the hub in one or the other direction and application of torque, said inner and outer teeth ends including flat abutment surfaces, chamfers on the axially outer ends of said wider teeth and on the opposed axially outer ends of the teeth on the member axially adjacent thereto, at least the chamfers on the axially outer ends of the wider collar teeth and on the opposing ends of the teeth on said axially adjacent member extending for less than the full height of said collar teeth, and flat abutment surfaces on the outer ends of the wider teeth between the chamfers and roots thereof.

6. A lockable shift transmission comprising a shaft, first and second clutchable members mounted in rotatable relation on said shaft and having external clutch teeth, a shift hub in rotatably fixed relation on the shaft between said toothed members and having two axially spaced rows of circumferentially spaced external teeth thereon alignable with the teeth of said clutchable members, a shift collar shiftable axially over said hub and members and having first and second axially spaced rows of aligned circumferentially spaced internal teeth engageable with the member and hub teeth and of a height at least equal to that of the hub teeth, the teeth of said first row being chordally wider than the teeth of said second row and axially shorter than the space between said two rows of teeth of the shift hub, said wider teeth being disposable in circumferentially overlapping relation alternatively with the axially outer and inner faces of the teeth of one of the two hub rows upon shifting of the collar to project axially beyond the hub in one direction or the other and application of torque, said inner and outer teeth ends including flat abutment surfaces, chamfers on the axially outer ends of the collar teeth and on the opposed axially outer ends of the teeth on said members, the chamfers on said wider teeth extending for less than the full height of the wider teeth and terminating short of the teeth roots, the teeth on the member axially adjacent the wider teeth being of substantially the same height as the wider teeth chamfers, and flat abutment surfaces on the outer ends of the wider teeth between the chamfers and roots engageable with said abutment surfaces on the inner and outer ends of said one row of hub teeth upon said circumferential overlapping, whereby to prevent return shifting of the collar during said torque application.

References Cited by the Examiner
UNITED STATES PATENTS

| | | | |
|---|---|---|---|
| 1,935,965 | 11/1933 | Wahlberg | 192—67 |
| 2,398,407 | 4/1946 | Brownyer | 192—114 X |
| 2,821,277 | 1/1958 | Hughes | 192—114 X |
| 2,846,038 | 8/1958 | Brownyer. | |
| 2,978,083 | 4/1961 | Henyon | 192—114 |

OTHER REFERENCES

Wimmer: 1,140,032 Nov. 22, 1962 (German printed application; 1 sht. dwg., 2 pp. spec.).

DAVID J. WILLIAMOWSKY, *Primary Examiner.*